United States Patent [19]

Tuck, Jr.

[11] 4,238,992

[45] Dec. 16, 1980

[54] PUMP DIAPHRAGM

[75] Inventor: Alan D. Tuck, Jr., Upland, Calif.

[73] Assignee: Wilden Pump & Engineering Co., Colton, Calif.

[21] Appl. No.: 956,189

[22] Filed: Oct. 30, 1978

[51] Int. Cl.³ .............................................. F16J 3/02
[52] U.S. Cl. ................................. 92/103.5 D; 92/99
[58] Field of Search ............... 92/98 R, 103.5 D, 104, 92/99, 100

[56] References Cited

U.S. PATENT DOCUMENTS

| | | | |
|---|---|---|---|
| 1,522,758 | 1/1925 | Thomas | 92/104 |
| 2,545,857 | 3/1951 | Perkins | 92/104 |
| 3,135,173 | 6/1964 | Jack, Jr. | 92/104 |
| 3,204,568 | 9/1965 | Grossfield | 92/104 |
| 3,872,777 | 3/1975 | Mastis | 92/99 |
| 3,911,796 | 10/1975 | Hull | 92/99 |
| 3,982,559 | 9/1976 | Ochs | 92/103.5 D |

*Primary Examiner*—Abraham Hershkovitz
*Attorney, Agent, or Firm*—Lyon & Lyon

[57] ABSTRACT

A diaphragm configuration is disclosed for an air-driven pump. The diaphragm includes concentric ribs on the pressure side of the flexure portion thereof. This has been found to extend the life of diaphragms made of relatively brittle materials such as synthetic resin polymers.

4 Claims, 1 Drawing Figure

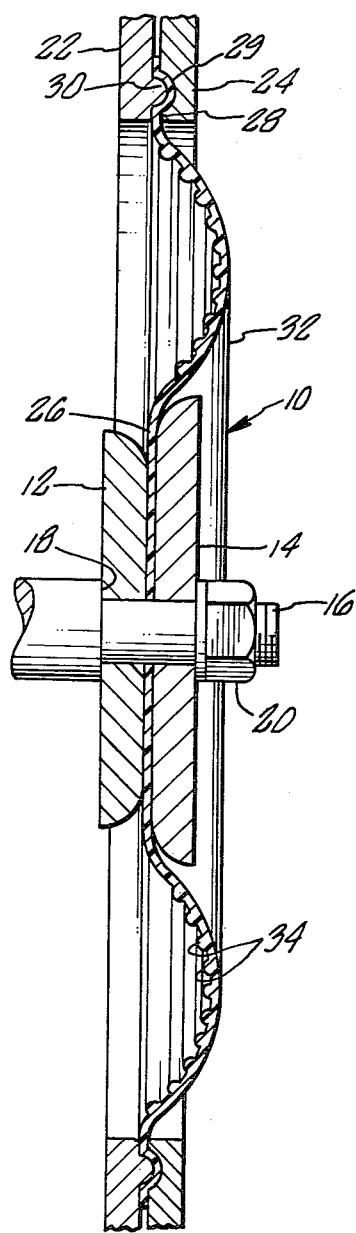

PUMP DIAPHRAGM

BACKGROUND OF THE INVENTION

The present invention relates to diaphragms for pressure driven pumps.

Air driven diaphragm pumps have found great utility in the pumping of materials and powders which have any one of the properties of being very non-homogenous, very viscous, very active chemically and very dirty. In view of the wide range of applications of such pumps, it is necessary to provide a wide range of construction materials which are not chemically sensitive, not easily abraded or not easily cut by the substances and mixtures passing through the pump. One group of diaphragm materials which has been found to exhibit multiple advantages in this regard are synthetic resin polymers, some of which are offered for sale under the trademark TEFLON. However, such materials also are relatively rigid and have a tendency to fail along defined distress lines under repeated flexure. Consequently, such materials have been generally felt to be economically unsuitable for use in such situations.

In the Applicant's own experience, diaphragms having a basic configuration like that of the present invention without the addition of the ribs of the present invention fail due to cracking along radial lines of the diaphragm after unacceptably low numbers of cycles of the diaphragm in a pump. Thus, TEFLON diaphragms have been found to be very expensive because of both the initial cost and the short life.

SUMMARY OF THE INVENTION

The present invention is directed to a diaphragm which can be used with relatively inflexible materials such as TEFLON. The present invention can substantially increase the life of such diaphragms which heretofore have experienced early failure due to radial cracking.

To increase the life of such TEFLON diaphragms, it has been found that concentric ribs provide sufficient stiffness in the circular direction while allowing relatively free radial extension of the diaphragm.

Accordingly, it is an object of the present invention to provide an improved diaphragm for diaphragm pumps.

It is another object of the present invention to provide a pump diaphragm less subject to radial cracking.

Other and further objects and advantages will appear hereinafter.

BRIEF DESCRIPTION OF THE DRAWING

The drawing is a cross-sectional side view of a diaphragram of the present invention shown with the immediately adjacent parts of an air driven diaphragm pump.

DETAILED DESCRIPTION OF THE PREFERRED EMBODIMENT

Looking to the drawing, a diaphragm, generally, designated 10 is illustrated in association with an inner piston 12 and an outer piston 14. The pistons are held in place by a piston rod 16 having a shoulder 18 and a threaded portion for receiving a nut 20. Portions of the inner housing 22 and outer housing 24 are also illustrated in association with the diaphragm 10.

The diaphragm 10 includes an inner attachment portion 26 which is intended to extend between the inner and outer pistons 12 and 14. A central hole is provided in the inner attachment portion 26 for receipt of the piston rod 16; and the inner attachment portion 26 is generally circular in plan.

Associated with the housing members 22 and 24 is an outer attachment portion 28. The outer attachment portion includes a semi-circular channel 29 which acts in interlocking engagement with a bead fixed on the housing. In the present embodiment, a bead 30 is shown integral with the housing 22. The bead may in fact be an independent piece locked in a channel within that housing. The semi-circular channel extends about the circumference of the diaphragm 10 and also helps to form a seal for the pumping chamber.

Located between the inner attachment portion 26 and the outer attachment portion 28 of the diaphragm is a flexure portion 32. The flexure portion 32 is annular in configuration and is concave on the air pressure side. The flexure portion is generally sheet like and the concavity allows for movement of the piston rod 16 without great resistance from the diaphragm itself.

Located on the pressure receiving side of the diaphragm are a number of concentrically arranged ribs 34. These ridges 34 are spaced substantially uniformly across the flexure portion 32 as can be seen in the drawing. A smooth transition between each rib and the main pressure side surface of the diaphragm 10 is used to prevent high stress points which could detract from the life of the diaphragm. The ribs 34 are configured to form an approximately sinusiodal surface on the diaphragm 10 wherein the valleys between the ribs provide a diaphragm thickness equal to the thickness of the unribbed portions of the diaphragm. The diaphragm thickness including a rib is almost twice the minimum thickness in the valleys between ribs.

The introduction of ribs on the diaphragm increase the moment of inertia resisting flexure along a line perpendicular to the longitudinal direction of the rib. Thus, the diaphragm of the present invention resists radial flexure more than conventional diaphragms. It has been found that this reduction in flexure adds to the life of TEFLON diaphragms. The addition of the ribs 34 also reduces the flexibility of the diaphragm to concentric flexure. Thus, the operative flexibility of the diaphragm in the direction in which it must flex to work is reduced. By increasing the thickness of the diaphragm at the ribs 34, greater strain is experienced by the areas of the diaphragm between ribs. However, it has been found that a net positive effect is gained by the use of the ribs 34.

As an example of one embodiment of the present invention, a diaphragm has been constructed having an overall diameter of 29.62 cm. (11 21/32"). The diaphragm thickness at the inner attachment portion 26, the outer attachment portion 28 and the valleys between the ribs 34 is 0.198 cm. (0.078"). The thickness of the diaphragm including the ribs 34 is 0.356 cm. (0.140"). The peaks of the ribs 34 are spaced 0.635 cm. (0.25") apart. There are ten such ribs in the flexure portion 32. The flexure portion has a width between the inner attachment portion 26 and the outer attachment portion 28 of 8.02 cm. (3.16").

Thus, an improved diaphragm has been devised by the present invention. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A diaphragm including an inner attachment portion, an outer attachment portion and a sheet-like, annular flexure portion made of a synthetic resin polymer bounded by said inner and outer attachment portions and having a concaved, fluid pressure receiving side, wherein the improvement comprises concentric, continuous ribs spaced substantially uniformly across the width of said fluid pressure receiving side of said flexure portion such that said surface is substantially sinusoidal in a radial direction.

2. The diaphragm of claim 1 wherein said ribs are integrally formed with said flexure portion.

3. A diaphragm including an inner attachment portion, an outer attachment portion, and a sheet like annular flexure portion bounded by said inner and outer attachment portions and having a concaved, fluid pressure receiving side, wherein the improvement comprises concentric continuous ribs spaced substantially uniformly across the width of said pressure receiving side of said flexure portion and said flexure portion is a synthetic resin polymer.

4. A diaphragm for an air driven diaphragm pump including an inner attachment portion, an outer attachment portion and a sheet like, annular flexure portion bounded by said inner and said outer attachment portions and having a concaved, air pressure receiving side and a convex working side, wherein the improvement comprises said air pressure receiving side having a plurality of concentric continuous ribs forming a substantially sinusoidal surface in a radial direction, said surface being substantially identical in all radial directions thereof, said convex working side being smooth, and said flexure portion being a synthetic resin polymer.

* * * * *